(12) United States Patent
Nishijima

(10) Patent No.: US 11,410,288 B2
(45) Date of Patent: Aug. 9, 2022

(54) IMAGE PROCESSING APPARATUS

(71) Applicant: TOYOTA JIDOSHA KABUSHIKI KAISHA, Toyota (JP)

(72) Inventor: Masakazu Nishijima, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/913,455

(22) Filed: Jun. 26, 2020

(65) Prior Publication Data

US 2021/0090234 A1    Mar. 25, 2021

(30) Foreign Application Priority Data

Sep. 24, 2019   (JP) .............................. JP2019-172637

(51) Int. Cl.
*G06K 9/00*    (2006.01)
*G06T 7/00*    (2017.01)
*G06T 7/73*    (2017.01)

(52) U.S. Cl.
CPC ........ *G06T 7/0002* (2013.01); *G06K 9/00798* (2013.01); *G06T 7/74* (2017.01); *G06T 2207/20016* (2013.01); *G06T 2207/30256* (2013.01)

(58) Field of Classification Search
CPC ..................... G06T 7/0002; G06T 7/74; G06T 2207/20016; G06T 2207/30256; G06K 9/00798; G06K 9/3233; G06K 9/00791; G08G 1/166; G08G 1/16
See application file for complete search history.

(56) References Cited

U.S. PATENT DOCUMENTS

| | | | | |
|---|---|---|---|---|
| 2002/0141618 | A1* | 10/2002 | Ciolli ..................... | G08G 1/20 382/104 |
| 2009/0132162 | A1* | 5/2009 | Kudoh ................ | G09B 29/106 701/533 |
| 2011/0141282 | A1* | 6/2011 | Notsu .................... | G08G 1/167 348/149 |
| 2012/0099763 | A1* | 4/2012 | Katoh ..................... | G06T 7/70 382/103 |
| 2016/0059781 | A1 | 3/2016 | Tatara | |

FOREIGN PATENT DOCUMENTS

| | | |
|---|---|---|
| JP | 2005-039547 A | 2/2005 |
| JP | 2007-336466 A | 12/2007 |
| JP | 2013-120988 A | 6/2013 |
| JP | 2016-048839 A | 4/2016 |

\* cited by examiner

*Primary Examiner* — Carol Wang
(74) *Attorney, Agent, or Firm* — Sughrue Mion, PLLC

(57) ABSTRACT

An image processing apparatus includes: a determiner that determines whether or not a vehicle in which a camera is mounted is located at a specific place where a traveling direction of the vehicle changes, the camera picking up an image of an entire image pickup range with first image quality and picking up an image of a partial region in the image pickup range with second image quality that is higher image quality than the first image quality; and a region changer that, when it is determined that the vehicle is located at the specific place, changes a position of the partial region in the image pickup range such that an image of a region of attention that is included in the image pickup range and an image of which is to be picked up with the second image quality is picked up.

13 Claims, 8 Drawing Sheets

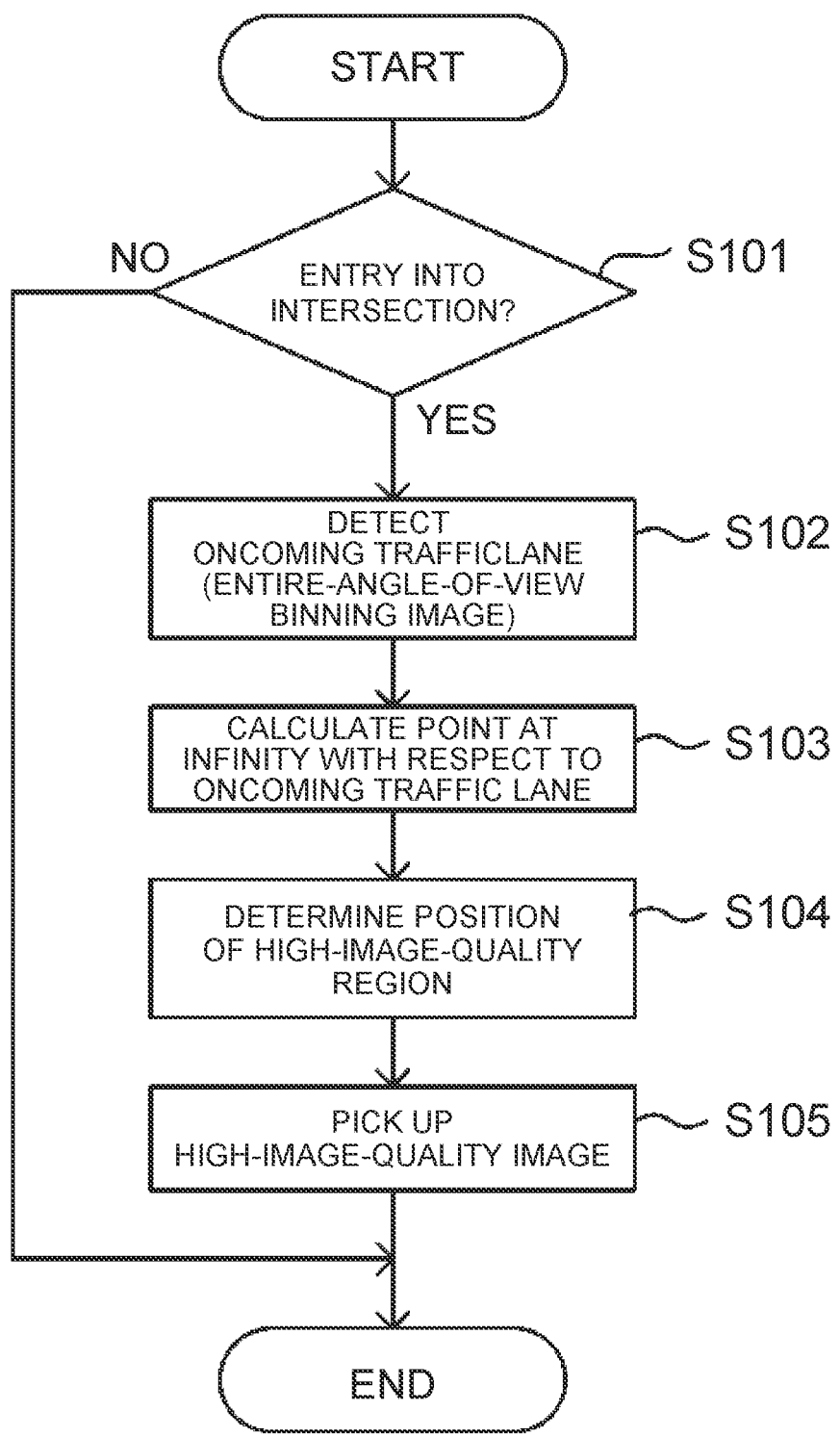

IMAGE PROCESSING APPARATUS

INCORPORATION BY REFERENCE

The disclosure of Japanese Patent Application No. 2019-172637 filed on Sep. 24, 2019 including the specification, drawings and abstract is incorporated herein by reference in its entirety.

BACKGROUND

1. Technical Field

The disclosure relates to a technical field of image processing apparatuses.

2. Description of Related Art

In some of apparatuses for image processing, attempts have been made to enhance processing speed, for example, by picking up an image of a portion in an image pickup range with high image quality, and picking up an image of the other portion in the image pickup range with low image quality. For a method of picking up an image with low image quality, a technique is proposed in which a binning image (that is, an image subjected to image quality reduction processing) is output by combining a plurality of pixels into one block pixel (see Japanese Patent Application Publication No. 2013-120988).

SUMMARY

In a case of an in-vehicle camera that picks up images of scenes ahead of a vehicle, a region on which attention should be focused, for example, in obstacle detection or the like is a center portion of an image pickup range (that is, a place that is in front of the vehicle and some distance from the vehicle), and therefore, in general, an image of the center portion is picked up with high image quality. On the other hand, for example, when the vehicle turns right or left or the like, the region on which attention should be focused deviates from the center portion of the image pickup range. Consequently, an image of the region on which attention should be focused is not picked up with high image quality, so that a technical problem arises that, for example, there is a possibility that the obstacle detection or the like is not appropriately performed. The problem cannot be solved by the technique described in JP 2013-120988 A.

The disclosure is made in light of the problem, and an object of the disclosure is to provide an image processing apparatus that can pick up an image of a region on which attention should be focused with high image quality.

An image processing apparatus according to an aspect of the disclosure includes: a determiner that determines whether or not a vehicle in which a camera is mounted is located at a specific place where a traveling direction of the vehicle changes, the camera picking up an image of an entire image pickup range with first image quality and picking up an image of a partial region in the image pickup range with second image quality that is higher image quality than the first image quality; and a region changer that, when it is determined that the vehicle is located at the specific place, changes a position of the partial region in the image pickup range such that an image of a region of attention is picked up, the region of attention being a region that is included in the image pickup range and an image of which is to be picked up with the second image quality, and being a region a position of which relative to the vehicle changes according to behavior of the vehicle.

According to the image processing apparatus, since the position of the partial region, which is a region an image of which is picked up with the second image quality, is changed such that an image of the region of attention is picked up with the second image quality. Accordingly, even if the region of attention (corresponding to the "region on which attention should be focused" mentioned above) deviates from the front of the vehicle, for example, when the vehicle turns right or left or the like, an image of the region of attention can be picked up with the second image quality that is relatively high image quality.

BRIEF DESCRIPTION OF THE DRAWINGS

Features, advantages, and technical and industrial significance of exemplary embodiments will be described below with reference to the accompanying drawings, in which like signs denote like elements, and wherein:

FIG. 2 is a flowchart showing operation of the image processing apparatus according to the first embodiment;

DETAILED DESCRIPTION OF EMBODIMENTS

Figure 1:
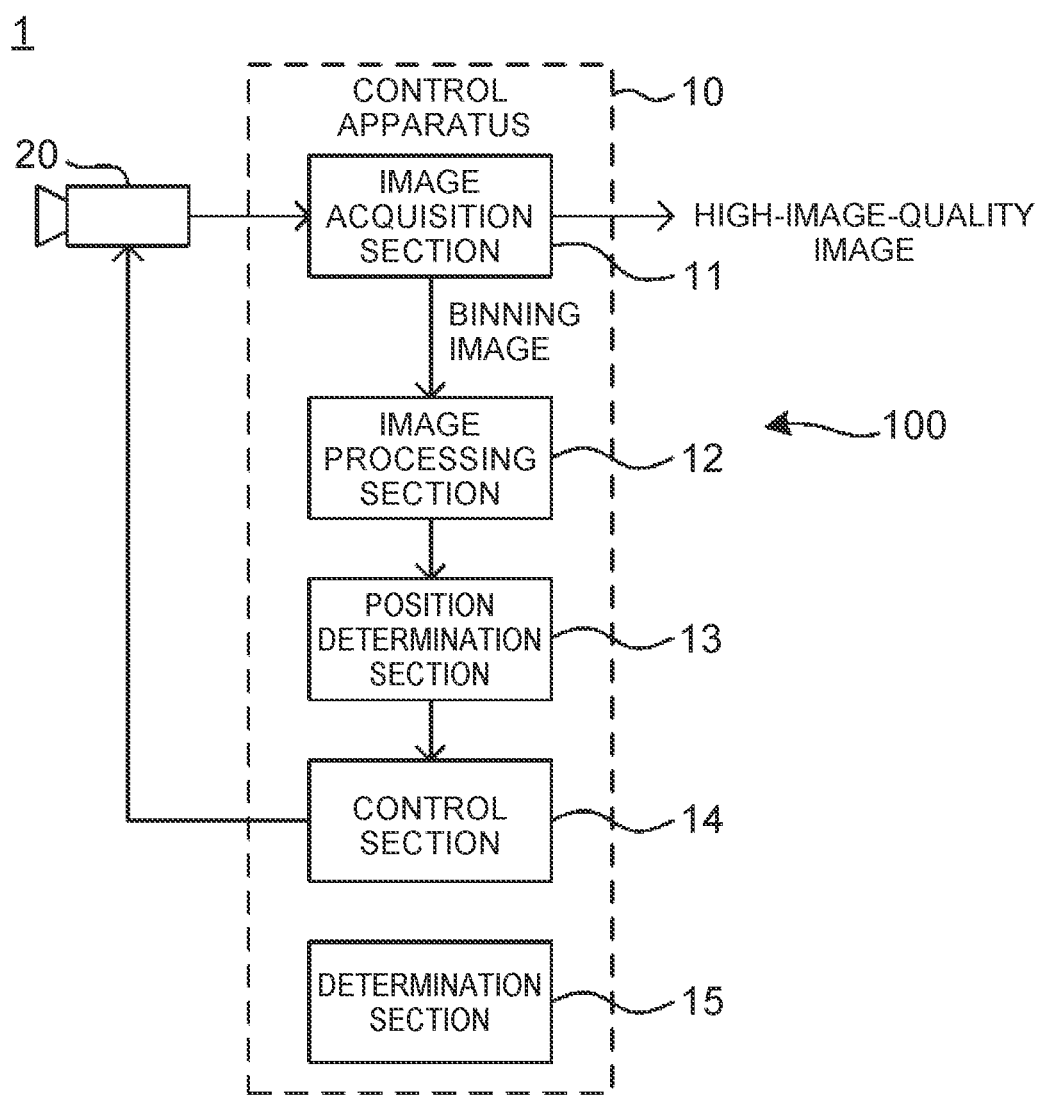
FIG. 1 is a block diagram showing a configuration of an image processing apparatus according to a first embodiment.

An embodiment related to an image processing apparatus will be described. The image processing apparatus according to the embodiment is configured to be able to control a camera. Note that the image processing apparatus may be configured as a separate member from the camera, or may be configured together with the camera in a single unit (for example, as a portion of the camera).

The camera picks up an image of an entire image pickup range with first image quality, and picks up an image of a partial region in the mage pickup range with second image quality that is higher image quality than the first image quality. The camera may include, for example, an imaging device that can pick up an image of the entire image pickup range with the second image quality. In such a case, image pickup with the first image quality may be performed by using existing image quality reduction processing such as binning processing. Picking up an image of the partial region with the second image quality may be performed by reading out pixel values of pixels corresponding to the partial region in the imaging device. Note that picking up an image of the partial region in the image pickup range may be treated as a concept of "cropping (or trimming) the partial region in the image pickup range".

Here, a size of the partial region may be set such that a processing load placed when an image of the entire image pickup range is picked up with the first image quality and a processing load placed when an image of the partial region is picked up with the second image quality are equivalent. When image pickup with first image quality is performed, for example, the size of the partial region may be the number of pixels equal to one fourth of the number of pixels included in the imaging device in a case where four pixels in the imaging device are treated as one block pixel.

The image processing apparatus includes a determiner and a region changer. The determiner determines whether or not a vehicle in which the camera is mounted (that is, a vehicle in which the image processing apparatus is mounted) is located at a specific place where a traveling direction of the vehicle changes. Here, the "traveling direction" is not limited to a direction in which the vehicle moves when the vehicle is viewed in a plane from above (for example, a direction determined by the vehicle rotating about an up-down axis of the vehicle), but is a concept also including a direction in which the vehicle moves in a three-dimensional space (for example, a direction determined by the vehicle rotating about a right-left axis of the vehicle in addition to the up-down axis of the vehicle).

Examples of the "specific place where the traveling direction changes" include an intersection at which a right or left turn may be made, a curved road, an ingress and an egress of a sloping road, and the like. Whether or not the vehicle is located at the specific place may be determined, for example, as follows. Specifically, it may be determined whether or not the vehicle is located at the specific place, from an image picked up by the camera, (i) by determining whether or not an object inherent to the specific place, such as a traffic light or a crosswalk, is captured, (ii) by detecting a change in FOE (Focus of Expansion), or (iii) by detecting curvature of a road. Alternatively, it may be determined whether or not the vehicle is located at the specific place, based on position information related to the vehicle and map information. Alternatively, it may be determined whether or not the vehicle is located at the specific place, based on a change in speed or a steering operation related to the vehicle.

When it is determined that the vehicle is located at the specific place, the region changer changes a position of the partial region (that is, the region an image of which is picked up with the second image quality) in the image pickup range such that an image of a region of attention is picked up. The region of attention is a region that is included in the image pickup range of the camera and an image of which is to be picked up with the second image quality, and is a region a position of which relative to the vehicle changes according to behavior of the vehicle.

The "region of attention" may be changed depending on a purpose of use of an image picked up by the camera, or the like. When the image is used for, for example, obstacle detection, the region of attention may be, typically, a road ahead of the vehicle. However, for example, at an intersection, an oncoming traffic lane, a sidewalk, or the like may be set as the region of attention. The "region of attention", as described above, is a region a position of which relative to the vehicle changes according to behavior of the vehicle. Accordingly, for example, when the vehicle is steered and the traveling direction of the vehicle is accordingly changed, the position of the region of attention in the image pickup range is also changed. For example, at an intersection, when the vehicle turns right or left, the region of attention (for example, an oncoming traffic lane or the like when the vehicle enters the intersection) deviates from the front of the vehicle.

Specifically, for example, the region changer may identify the region of attention based on the image picked up with the first image quality, and may change the position of the partial region in the image pickup range such that an image of the region of attention is picked up. Changing of the "position of the partial region" may be accomplished by changing pixels from which pixel values are read out, among a plurality of pixels included in the imaging device.

According to the image processing apparatus, the position of the partial region, which is the region an image of which is picked up with the second image quality, is changed such that an image of the region of attention is picked up with the second image quality. Accordingly, even if the region of attention deviates from the front of the vehicle, for example, when the vehicle turns right or left or the like, an image of the region of attention can be picked up with the second image quality that is relatively high image quality.

First Embodiment

An in-vehicle camera 100 as a specific example of the image processing apparatus according to the embodiment will be described with reference to FIGS. 1 to 3B. Here, it is assumed that the image processing apparatus is configured as a portion of the in-vehicle camera 100.

The in-vehicle camera 100 is mounted in a vehicle 1. In FIG. 1, the in-vehicle camera 100 includes a control apparatus 10 and a main-body portion 20. Here, the "control apparatus 10" and the "main-body portion 20" correspond to the "image processing apparatus" and the "camera", respectively. The control apparatus 10 is configured to be able to control the main-body portion 20. The control apparatus 10 may control the main-body portion 20, for example, such that picking up an image of the entire image pickup range with the first image quality and picking up an image of the partial region in the image pickup range with the second image quality are alternately performed.

Note that hereinafter, the partial region in the image pickup range will be referred to as "high-image-quality region" as appropriate. Hereinafter, an image of the entire image pickup range picked up with the first image quality will be referred to as "binning image" as appropriate. Hereinafter, an image of the partial region in the image pickup range picked up with the second image quality will be referred to as "high-image-quality image" as appropriate.

The control apparatus 10 internally includes an image acquisition section 11, an image processing section 12, a position determination section 13, a control section 14, and a determination section 15, as logically implemented processing blocks or physically implemented processing circuits. The main-body portion 20 includes an imaging device and an optical system, which are not depicted here.

The image acquisition section 11 acquires a binning image and a high-image-quality image from the main-body portion 20. The image acquisition section 11 outputs the binning image to the image processing section 12 and outputs the high-image-quality image to, for example, an apparatus using an image picked up by the in-vehicle camera 100, such as an obstacle detection apparatus.

The image processing section 12 detects a region of attention from the binning image. Here, a specific description will be given assuming that the region of attention is an "oncoming traffic lane when the vehicle 1 enters an intersection". The image processing section 12 detects a region corresponding to the oncoming traffic lane from the binning image. The image processing section 12 calculates a point at infinity with respect to the detected region corresponding to the oncoming traffic lane. Note that for the detection of the region corresponding to the oncoming traffic lane and the calculation of the point at infinity, existing techniques can be applied, and therefore a detailed description will be omitted.

Based on the point at infinity calculated by the image processing section 12, the position determination section 13 determines a position of the high-image-quality region in the image pickup range such that an image of the region of attention is picked up with the second image quality. At the time, the position determination section 13 may determine the position of the high-image-quality region, for example, such that the point at infinity is included in the high-image-quality region. In such a case, the position determination section 13 may determine the position of the high-image-quality region, for example, such that the point at infinity is located in a specific region within the high-image-quality region, or may determine the position of the high-image-quality region, for example, such that the point at infinity is included in the high-image-quality region and a change in the position of the high-image-quality region is restrained. Note that the image processing section 12 and the position determination section 13 correspond to an example of the "region changer".

Based on the position of the high-image-quality region determined by the position determination section 13, the control section 14 controls the main-body portion 20 such that a high-image-quality image is picked up (in other words, an image of the high-image-quality region is picked up with the second image quality).

The determination section 15 determines, for example, based on the binning image, whether or not the vehicle 1 is located at an intersection as an example of the "specific place where the traveling direction changes". Note that the determination section 15 corresponds to an example of the "determiner".

An additional description will be given of operation of the in-vehicle camera 100, with reference to a flowchart of FIG. 2.

In FIG. 2, the determination section 15 determines, based on the binning image, whether or not the vehicle 1 enters an intersection (that is, whether or not the vehicle 1 is located at an intersection) (step S101). When it is determined in the processing in step S101 that the vehicle 1 does not enter an intersection (step S101: No), the operation is terminated. In such a case, the high-image-quality region may be set in a center portion of the image pickup range. Thereafter, after a predetermined time period (for example, tens of milliseconds to hundreds of milliseconds, or the like) has passed, the processing in step S101 is performed. In other words, the operation shown in FIG. 2 is repeated at a cycle according to the predetermined time period.

When it is determined in the processing in step S101 that the vehicle 1 enters an intersection (step S101: Yes), the image processing section 12 detects, from the binning image, a region corresponding to an oncoming traffic lane (step S102). Subsequently, the image processing section 12 calculates a point at infinity with respect to the detected region corresponding to the oncoming traffic lane (step S103).

Subsequently, based on the point at infinity calculated by the image processing section 12, the position determination section 13 determines a position of the high-image-quality region in the image pickup range (step S104). Thereafter, based on the position of the high-image-quality region determined by the position determination section 13, the control section 14 controls the main-body portion 20 such that a high-image-quality image is picked up (step S105).

Figure 3A:
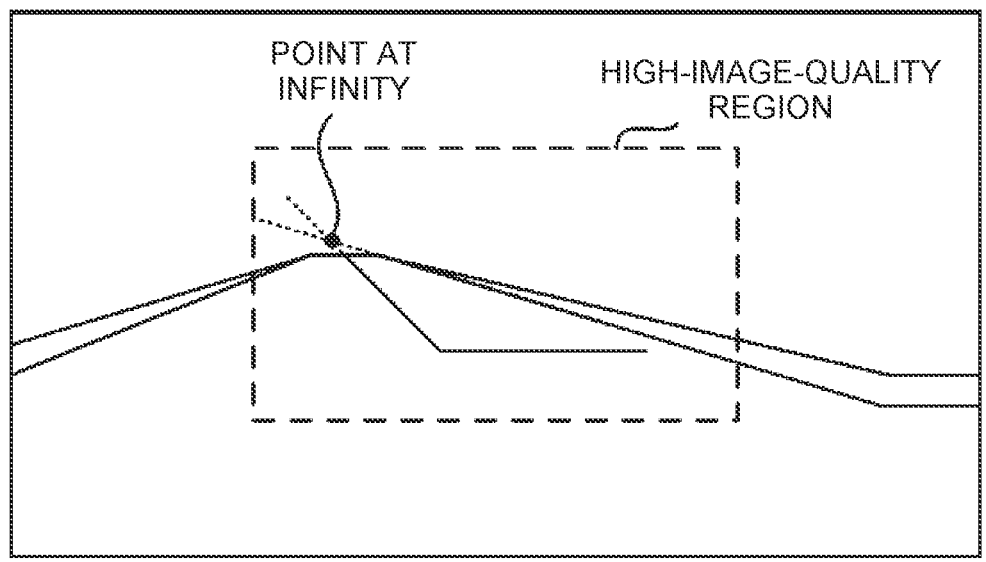
FIG. 3A shows an example of a position of a high-image-quality region.
Figure 3B:
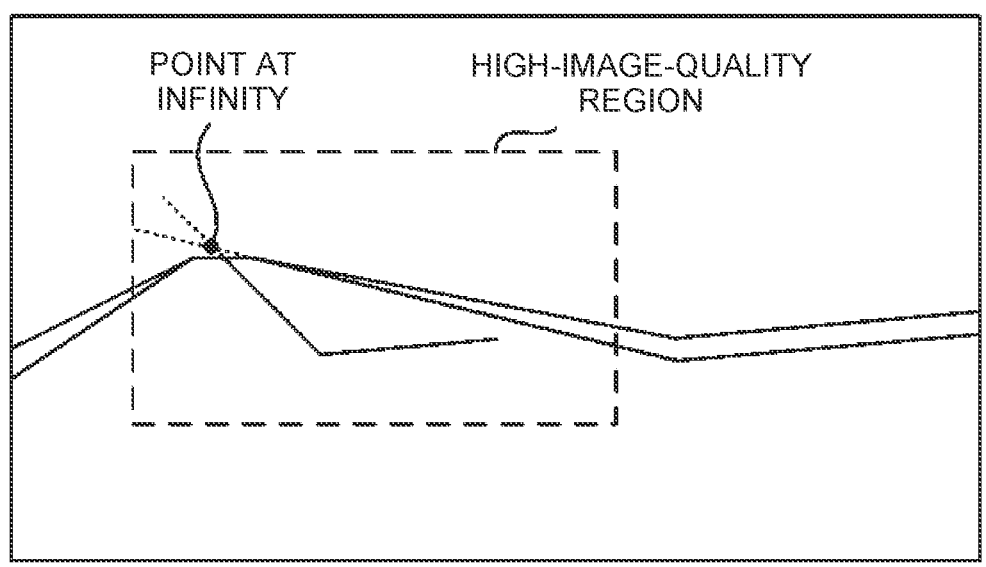
FIG. 3B shows an example of a position of a high-image-quality region.

Here, a specific description will be given, with reference to FIGS. 3A and 3B, of how the position of the high-image-quality region is determined through the operation shown in FIG. 2 when the vehicle 1 turns right at the intersection. FIG. 3A shows an example of the binning image before the vehicle 1 starts turning right when entering the intersection. FIG. 3B shows an example of the binning image after the vehicle 1 starts turning right at the intersection.

As shown in FIG. 3A, before the vehicle 1 starts turning right, since the oncoming traffic lane is located in front of the vehicle 1, a point at infinity with respect to the region corresponding to the oncoming traffic lane in the binning image is at a position relatively close to the center of the binning image. Accordingly, the high-image-quality region may be set in the center portion of the binning image (in other words, the center portion of the image pickup range) (see a dashed-line frame in FIG. 3A).

As shown in FIG. 3B, when the vehicle 1 starts turning right, the point at infinity moves toward a left side of the binning image, according to movement of the vehicle 1. Accordingly, the high-image-quality region is set at a position to the left of the center of the binning image compared with the case shown in FIG. 3A (see a dashed-line frame in FIG. 3B).

Technical Advantageous Effects

According to the in-vehicle camera 100 as a specific example of the image processing apparatus according to the embodiment, since a position of the high-image-quality region is determined based on a point at infinity with respect to an oncoming traffic lane when the vehicle 1 enters an intersection, when the vehicle 1 turns right at the intersection, a high-image-quality image of the oncoming traffic lane as an example of the region of attention can be appropriately picked up. For example, if obstacle detection is performed by using the then picked up high-image-quality image, it can be expected that when the vehicle 1 turns right at the intersection, an oncoming vehicle traveling on the oncoming traffic lane is detected in a preferable manner. As a result, it can be expected that a collision between the vehicle 1 and the oncoming vehicle (so-called right-turn accident) is prevented.

In the in-vehicle camera 100, since only an image of the high-image-quality region that is the partial region in the image pickup range is picked up with the second image quality, a processing load can be reduced, compared with a case where an image of the entire image pickup range is picked up with the second image quality. Specifically, for example, when the high-image-quality region has one fourth of the size of the image pickup range, the processing load can be reduced to one fourth compared with the case where an image of the entire image pickup range is picked up with the second image quality.

First Modification Example

In the first embodiment described above, the case where the vehicle 1 turns right at an intersection is taken as an example. However, the in-vehicle camera 100 is also applicable, for example, in a case where the vehicle 1 turns left at an intersection. In such a case, the region of attention may be, for example, "crosswalk and sidewalk". For example, it may be determined whether the vehicle 1 turns right or turns left at an intersection, based on an operating state of a turn signal of the vehicle 1, and the region of attention may be changed.

In such a case, in processing corresponding to the processing in step S102, the image processing section 12 may detect a region corresponding to a crosswalk and a sidewalk from the binning image. Thereafter, in processing corresponding to the processing in step S103, the image processing section 12 may calculate a point at infinity with respect to the detected region corresponding to the crosswalk and the sidewalk. In processing corresponding to the processing in step S104, the position determination section 13 may determine a position of the high-image-quality region in the image pickup range, based on the point at infinity calculated by the image processing section 12.

Second Modification Example

Although an intersection is taken as an example of the specific place where the traveling direction changes in the first embodiment described above, for example, a curved road may be set as the specific place where the traveling direction changes. In such a case, the region of attention may be, for example, "road (or roadway)".

In such a case, in processing corresponding to the processing in step S101, the determination section 15 may determine whether or not the vehicle 1 enters a curved road (that is, whether or not the vehicle 1 is located on a curved road), based on the binning image (for example, curvature of a road captured in the binning image).

In processing corresponding to the processing in step S104, the position determination section 13 may determine a position of the high-image-quality region in the image pickup range, for example, based on at least one of the curvature of the road captured in the binning image and a point at infinity with respect to a region corresponding to the road calculated by the image processing section 12 (in the latter case, for example, the point at infinity may be obtained from a tangent to the curved road).

Second Embodiment

An in-vehicle camera 200 as another specific example of the image processing apparatus according to the embodiment will be described with reference to FIG. 4. A second embodiment is similar to the first embodiment, except that part of the operation of the determination section 15 is different. Accordingly, a description of the second embodiment that overlaps with the first embodiment is omitted, and basically only different points will be described with reference to FIG. 4, while in the drawings, common elements are denoted by the same sings.

Figure 4:
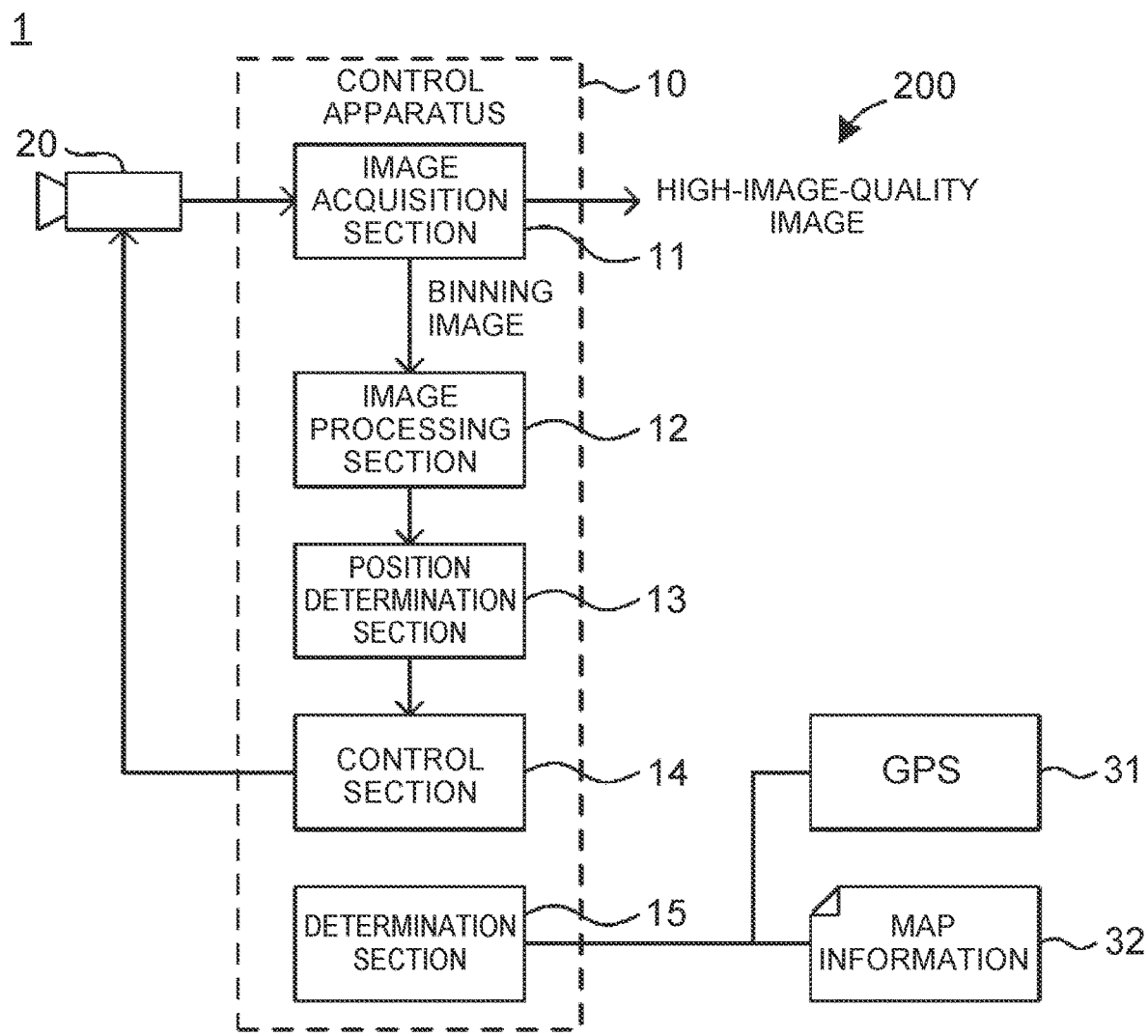
FIG. 4 is a block diagram showing a configuration of an image processing apparatus according to a second embodiment.

As shown in FIG. 4, the determination section 15 of the in-vehicle camera 200 is configured to be able to refer to a position of the vehicle 1 detected by a GPS (Global Positioning System) 31 and map information 32. In processing corresponding to the processing in step S101, the determination section 15 determines whether or not the vehicle 1 enters an intersection, based on the position of the vehicle 1 detected by the GPS 31 and the map information 32.

With such a configuration, it can be relatively easily determined whether or not the vehicle 1 is located at the specific place where the traveling direction changes (here, an intersection). Note that the in-vehicle camera 200 is applicable not only to a case where the vehicle 1 turns right at the intersection, but also to a case where the vehicle 1 turns left at the intersection and a case where the vehicle 1 travels on a curved road (see each modification example of the first embodiment).

Modification Example

Vicinities of an ingress and an egress of a sloping road may be set as the specific place where the traveling direction changes. Operation of the in-vehicle camera 200 in such a case will be described with reference to a flowchart of FIG. 5. Here, it is assumed that the position determination section 13 is configured to be able to refer to the position of the vehicle 1 detected by the GPS 31 and the map information 32. It is assumed that the map information 32 includes gradient information related to road gradients.

Figure 5:
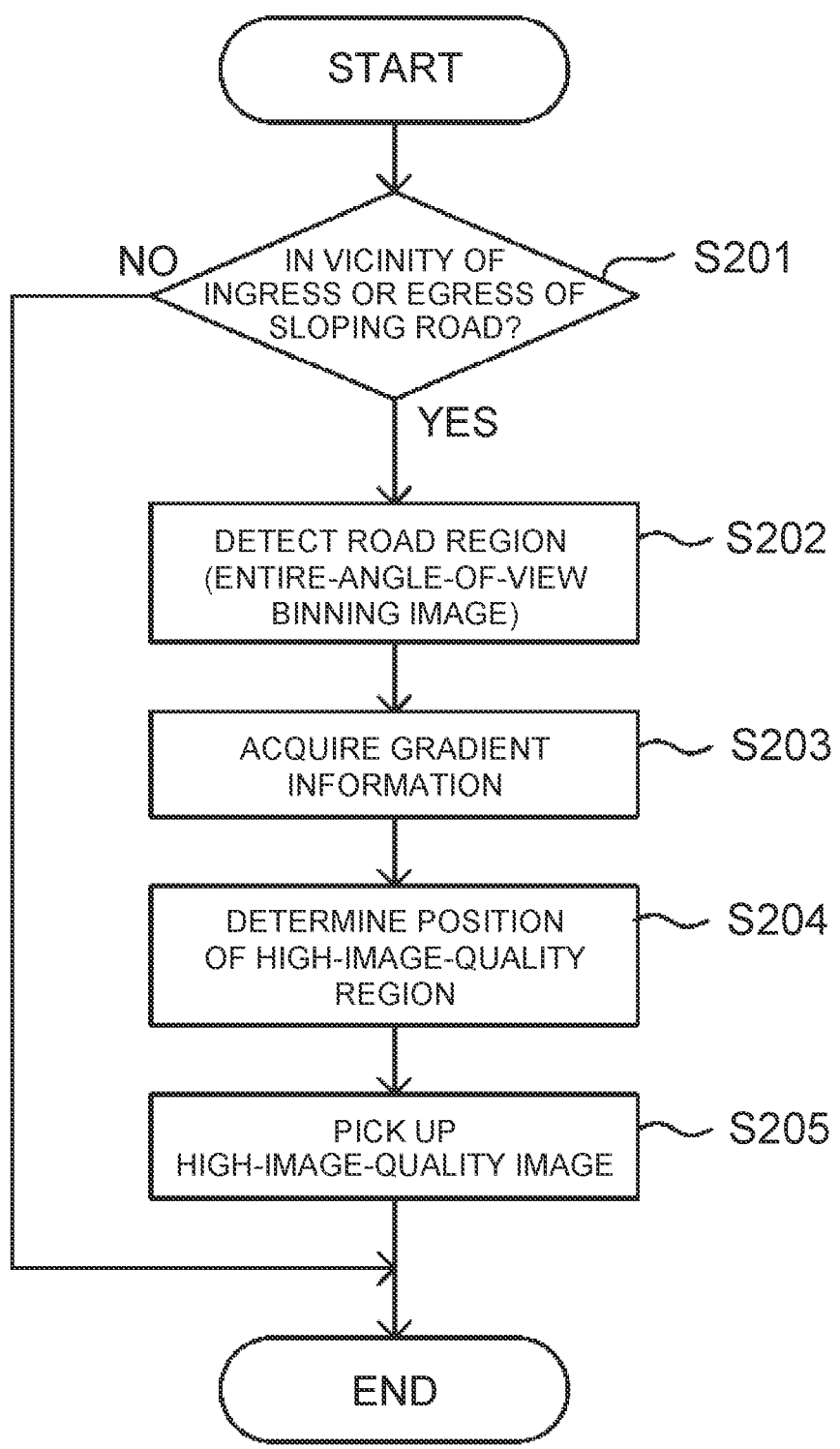
FIG. 5 is a flowchart showing operation of the image processing apparatus according to a modification example of the second embodiment.

In FIG. 5, the determination section 15 determines whether or not the vehicle 1 is located in the vicinity of an ingress or an egress of a sloping road, based on the position of the vehicle 1 detected by the GPS 31 and the map information 32 (step S201).

A range corresponding to the "vicinity" may vary, for example, depending on a speed of the vehicle 1, or on an apparatus or a function using a high-image-quality image (for example, obstacle detection or the like). Specifically, in a case where a high-image-quality image picked up by the in-vehicle camera 200 is used for obstacle detection, the range corresponding to the "vicinity" may be a range of radius of a dozen to twenty meters from the ingress or the egress of the sloping road when the speed of the vehicle 1 is relatively low (for example, 30 kilometers per hour or the like), and the range corresponding to the "vicinity" may be a range of radius of 60 to 100 meters from the ingress or the egress of the sloping road when the speed of the vehicle 1 is relatively high (for example, 80 kilometers per hour or the like).

When it is determined in the processing in step S201 that the vehicle 1 is located neither in the vicinity of the ingress nor in the vicinity of the egress of the sloping road (step S201: No), the operation is terminated. In such a case, the high-image-quality region may be set in the center portion of the image pickup range. Thereafter, after the predetermined time period has passed, the processing in step S201 is performed.

When it is determined in the processing in step S201 that the vehicle 1 is located in the vicinity of the ingress or the egress of the sloping road (step S201: Yes), the image processing section 12 detects, for example, a region corresponding to the road from the binning image (step S202). At the time, the image processing section 12 may calculate a point at infinity with respect to the region corresponding to the road.

In parallel with the processing in step S202, the position determination section 13 acquires gradient information related to a road ahead to be followed by the vehicle 1, based on the position of the vehicle 1 detected by the GPS 31 and the gradient information included in the map information 32 (step S203).

Based on the gradient information acquired by the image processing section 12, the position determination section 13 determines a position of the high-image-quality region in the image pickup range (step S204). Thereafter, the control section 14 controls the main-body portion 20 such that a high-image-quality image is picked up based on the position of the high-image-quality region determined by the position determination section 13 (step S205).

When the vehicle 1 is located in the vicinity of the ingress of the sloping road, the high-image-quality region is located on an upper-end side (upslope) or a lower-end side (downslope) of the image pickup range. When the vehicle 1 is located in the vicinity of the egress of the sloping road, the high-image-quality region is located on the lower-end side (upslope) or the upper-end side (downslope) of the image pickup range.

In the processing in step S204, the position determination section 13 may determine a position in an up-down direction of the high-image-quality region in the image pickup range, based on the gradient information acquired by the image processing section 12, and may determine a position in a right-left direction of the high-image-quality region in the image pickup range, based on the point at infinity calculated by the image processing section 12. The position determination section 13 may determine a position in the up-down direction of the high-image-quality region in the image pickup range, based on the gradient information acquired by the image processing section 12, and may adjust the position in the up-down direction, depending on a distance from the position of the vehicle 1 to the ingress or the egress of the sloping road.

Note that when the vehicle 1 travels on the sloping road (that is, when the vehicle 1 travels neither in the vicinity of the ingress nor in the vicinity of the egress of the sloping road), the high-image-quality region may be set in the center of the image pickup range.

Third Embodiment

An in-vehicle camera 300 as another specific example of the image processing apparatus according to the embodiment will be described with reference to FIGS. 6 and 7. A third embodiment is similar to the second embodiment described above, except that part of the operation of the position determination section 13 is different. Accordingly, a description of the third embodiment that overlaps with the second embodiment is omitted, and basically only different points will be described with reference to FIGS. 6 and 7, while in the drawings, common elements are denoted by the same sings.

Figure 6:
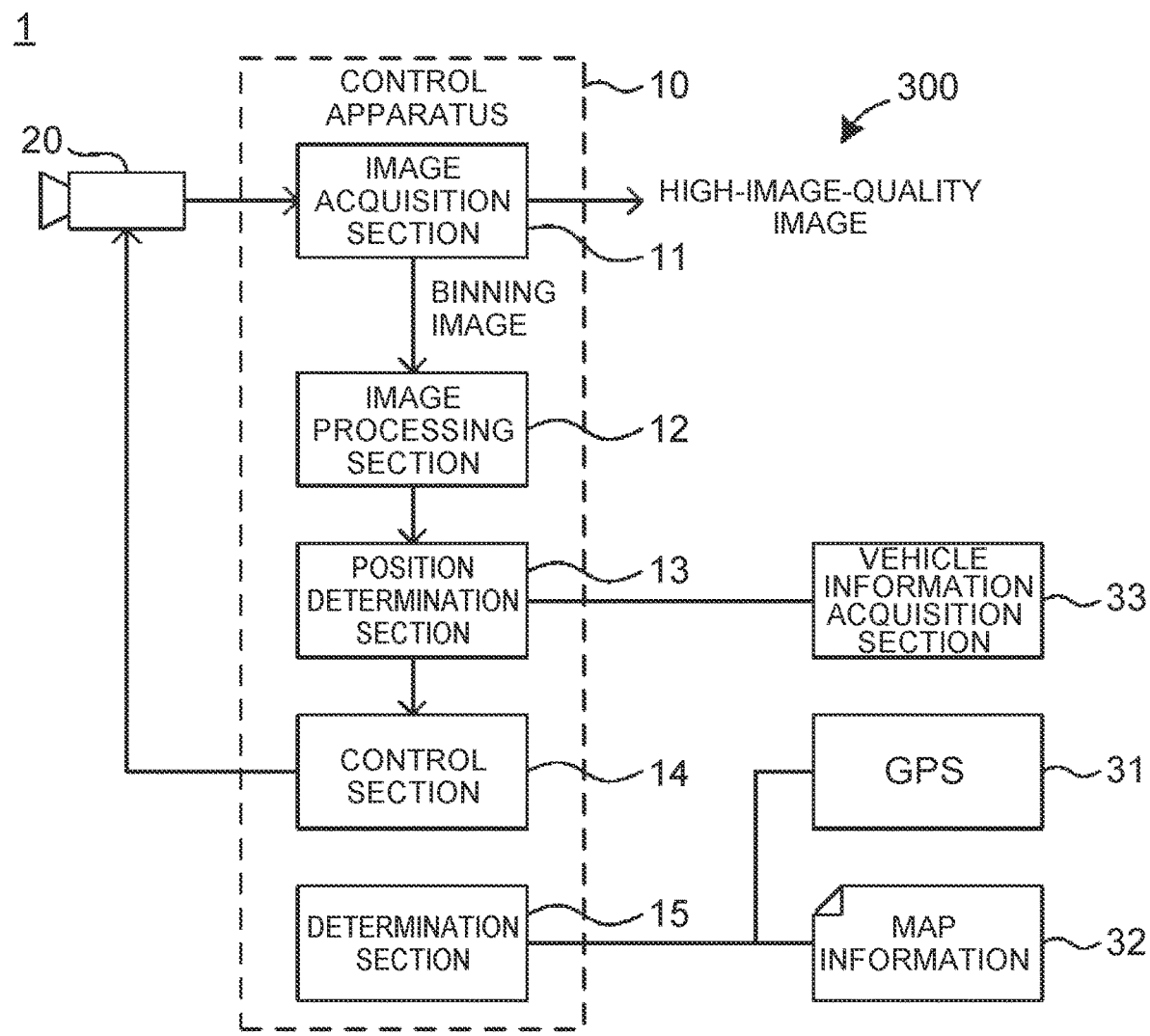
FIG. 6 is a block diagram showing a configuration of an image processing apparatus according to a third embodiment.

As shown in FIG. 6, the position determination section 13 of the in-vehicle camera 300 is configured to be able to refer to vehicle information acquired by a vehicle information acquisition section 33. Here, the vehicle information acquisition section 33 is configured to acquire the vehicle information related to behavior of the vehicle 1 detected by various in-vehicle sensors such as a vehicle speed sensor, a steering angle sensor, and a yaw rate sensor. Note that a detailed description of the vehicle information acquisition section 33 is omitted because various existing modes are applicable.

In parallel with the processing in step S102, the position determination section 13 acquires, from the vehicle information acquisition section 33, angle information related to the vehicle 1 (specifically, angle information indicating at least one of a steering angle and a body rotation angle of the vehicle 1) included in the vehicle information (step S303). Based on the acquired angle information, the position determination section 13 determines a position of the high-image-quality region in the image pickup range such that the high-image-quality region moves in a direction opposite to a direction in which the vehicle 1 rotates, on the condition that the vehicle 1 turns right (step S304).

At the time, based on the acquired angle information, the position determination section 13, for example, may calculate an extent of the rotation of the vehicle 1 per frame period of the in-vehicle camera 300, and may determine the position of the high-image-quality region in the image pickup range based on the calculated extent of rotation.

Figure 7:
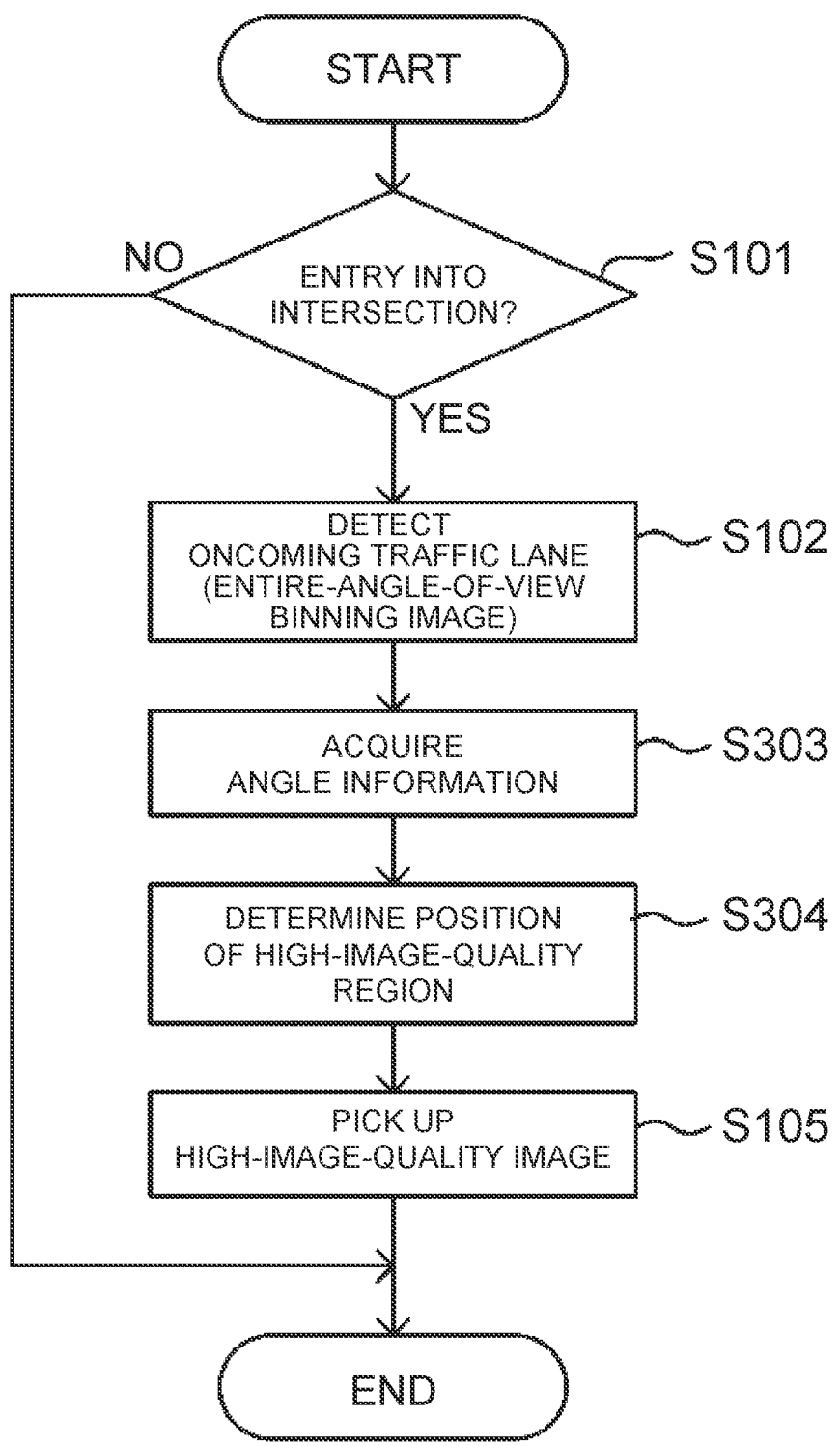
FIG. 7 is a flowchart showing operation of the image processing apparatus according to the third embodiment.

Note that the processing shown in FIG. 7 may be terminated on the condition that in the processing in step S102, the image processing section 12 does not detect a region corresponding to an oncoming traffic lane when the vehicle 1 enters an intersection. Alternatively, the processing shown in FIG. 7 may be terminated on the condition that, for example, the steering angle is kept constant, or steering in a direction opposite to an original direction (so-called turn-back steering) is made, based on the angle information acquired in the processing in step S303.

Note that the in-vehicle camera 300 is applicable not only to a case where the vehicle 1 turns right at an intersection, but also to a case where the vehicle 1 turns left at an intersection. In such a case, the region of attention may be, for example, "crosswalk and sidewalk".

Modification Example

As in the second modification example of the first embodiment, for example, a curved road may be set as the specific place where the traveling direction changes.

Figure 8:
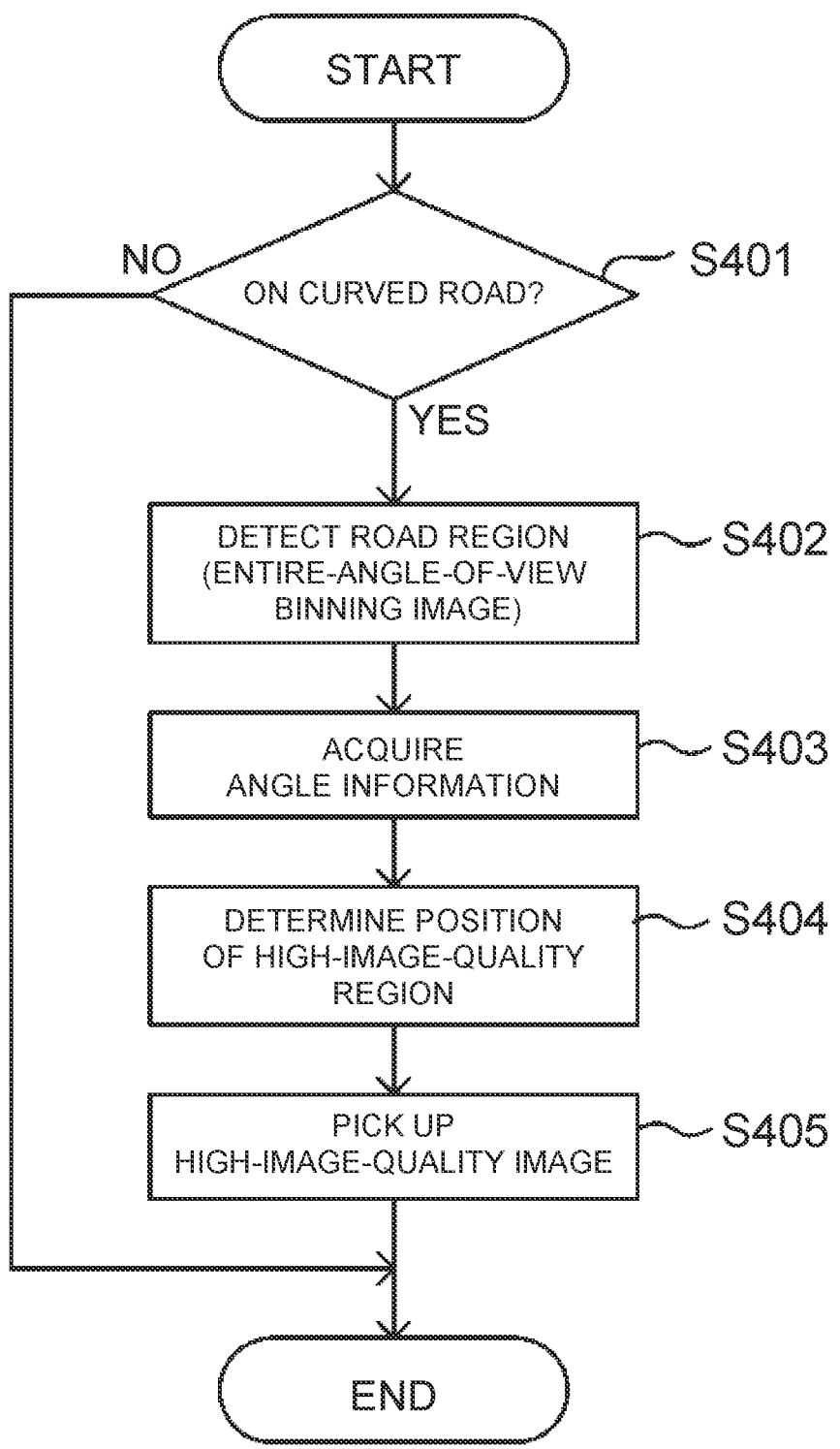
FIG. 8 is a flowchart showing operation of the image processing apparatus according to a modification example of the third embodiment.

In such a case, as shown in FIG. 8, the determination section 15 of the in-vehicle camera 300 determines whether or not the vehicle 1 enters a curved road (that is, whether or not the vehicle 1 is located on a curved road), based on the position of the vehicle 1 detected by the GPS 31 and the map information 32 (step S401).

When it is determined in the processing in step S401 that the vehicle 1 does not enter a curved road (step S401: No), the operation is terminated. In such a case, the high-image-quality region may be set in the center portion of the image pickup range. Thereafter, after the predetermined time period has passed, the processing in step S401 is performed.

When it is determined in the processing in step S401 that the vehicle 1 enters a curved road (step S401: Yes), the image processing section 12 detects, for example, a region corresponding to the road from the binning image (step S402).

In parallel with the processing in step S402, the position determination section 13 acquires the angle information related to the vehicle 1 from the vehicle information acquisition section 33 (step S403). Based on the acquired angle information, the position determination section 13 determines a position of the high-image-quality region in the image pickup range such that the high-image-quality region moves in the same direction as the direction in which the vehicle 1 rotates (step S404). At the time, the position determination section 13 may adjust the position of the high-image-quality region, based on the region corresponding to the road detected by the image processing section 12 in the processing in step S402.

Others (1) Although the image processing apparatus is configured as a portion of the in-vehicle camera in the first to third embodiments, the control apparatus 10 (see FIG. 1 and others) corresponding to the image processing apparatus may be configured as a separate member from the main-body portion 20 (that is, the camera). In such a case, the control apparatus 10 may be implemented, for example, by an ECU (Electronic Control Unit) of the vehicle 1.

(2) In the first to third embodiments, in the main-body portion 20 (that is, the camera), a high-image-quality image is obtained, for example, by reading out pixel values of pixels corresponding to the high-image-quality region. However, an image of the entire image pickup range may be picked up with the second image quality (that is, high image quality) by the main-body portion 20. The then picked up image is referred to as entire-angle-of-view high-image-quality image.

The control apparatus 10 (that is, the image processing apparatus) may extract (that is, trim) a partial region including the region of attention from the entire-angle-of-view high-image-quality image. With such a configuration, for example, in an obstacle detection apparatus or the like, a processing load on the obstacle detection apparatus can be reduced, compared with a case where the entire-angle-of-view high-image-quality image is used. Note that for a method of determining a position of the partial region in the image pickup range, a method similar to the methods described in the first embodiment and the like may be used.

Various aspects of the disclosure derived from the embodiments and the modification examples will be described below.

An image processing apparatus according to an aspect of the disclosure includes: a determiner that determines whether or not a vehicle in which an in-vehicle camera is mounted is located at a specific place where a traveling direction of the vehicle changes, the in-vehicle camera picking up an image of an entire image pickup range with first image quality and picking up an image of a partial region in the image pickup range with second image quality that is higher image quality than the first image quality; and a region changer that, when it is determined that the vehicle is located at the specific place, changes a position of the partial region in the image pickup range such that an image of a region of attention is picked up, the region of attention being a region that is included in the image pickup range and an image of which is to be picked up with the second image quality, and being a region a position of which relative to the vehicle changes according to behavior of the vehicle.

In an aspect of the image processing apparatus, the region changer identifies a point at infinity in the image of the entire image pickup range picked up with the first image quality, and changes the position of the partial region based on the identified point at infinity.

In the aspect, the specific place is an intersection; the region of attention is an oncoming traffic lane when the vehicle enters the intersection; and the region changer may identify the point at infinity with respect to the oncoming traffic lane in the image, and change the position of the partial region based on the identified point at infinity.

In another aspect of the image processing apparatus, the region changer acquires angle information indicating at least one of a steering angle and a body rotation angle of the vehicle, and changes the position of the partial region based on the acquired angle information.

In the aspect, the specific place is an intersection; the region of attention is an oncoming traffic lane when the vehicle enters the intersection; and the region changer may change the position of the partial region based on the acquired angle information such that the partial region moves in a direction opposite to a direction in which the vehicle rotates.

In still another aspect of the image processing apparatus, the specific place is a vicinity of an ingress or an egress of a sloping road; and the region changer identifies a gradient of the sloping road from map information including gradient information and from position information indicating a current position of the vehicle, and changes the position of the partial region based on the identified gradient.

The disclosure is not limited to the embodiments described above, and various modifications can be made as appropriate without departing from the gist or the idea of the disclosure which can be understood from the claims and the description in its entirety, and the image processing apparatus with such modifications is also incorporated in the technical scope of the disclosure.

What is claimed is:

1. An image processing apparatus, comprising:
   a determiner that determines whether or not a vehicle in which a camera is mounted is located at a specific place where a traveling direction of the vehicle changes, the camera picking up an image of an entire image pickup range with first image quality and picking up an image of a partial region in the image pickup range with second image quality that is higher image quality than the first image quality; and
   a region changer that, when it is determined that the vehicle is located at the specific place, changes a position of the partial region in the image pickup range such that an image of a region of attention is picked up, the region of attention being a region that is included in the image pickup range and an image of which is to be picked up with the second image quality, and being a region that is at a position relative to the vehicle and that changes according to a behavior of the vehicle.

2. The image processing apparatus according to claim 1, wherein the region changer identifies a point at infinity in the image of the entire image pickup range picked up with the first image quality, and changes the position of the partial region based on the identified point at infinity.

3. The image processing apparatus according to claim 2, wherein:
   the specific place is an intersection;
   the region of attention is an oncoming traffic lane when the vehicle enters the intersection; and
   the region changer identifies the point at infinity with respect to the oncoming traffic lane in the image, and changes the position of the partial region based on the identified point at infinity.

4. The image processing apparatus according to claim 1, wherein the region changer acquires angle information indicating at least one of a steering angle and a body rotation angle of the vehicle, and changes the position of the partial region based on the acquired angle information.

5. The image processing apparatus according to claim 4, wherein:
   the specific place is an intersection;
   the region of attention is an oncoming traffic lane when the vehicle enters the intersection; and
   the region changer changes the position of the partial region based on the acquired angle information such that the partial region moves in a direction opposite to a direction in which the vehicle rotates.

6. The image processing apparatus according to claim 1, wherein:
   the specific place is a vicinity of an ingress or an egress of a sloping road; and
   the region changer identifies a gradient of the sloping road from map information including gradient information and from position information indicating a current position of the vehicle, and changes the position of the partial region based on the identified gradient.

7. An image processing apparatus, comprising:
   an in-vehicle camera; and
   an electronic control unit (ECU) that determines whether or not a vehicle in which the in-vehicle camera is mounted is located at a specific place where a traveling direction of the vehicle changes, the in-vehicle camera picking up an image of an entire image pickup range with first image quality and picking up an image of a partial region in the image pickup range with second image quality that is higher image quality than the first image quality; and wherein when the ECU has determined that the vehicle is located at the specific place, the ECU changes a position of the partial region in the image pickup range of the in-vehicle camera such that an image of a region of attention is picked up, the region of attention being a region that is included in the image pickup range and an image of which is to be picked up with the second image quality, and being a region that is at a position relative to the vehicle and that changes according to a behavior of the vehicle.

8. The image processing apparatus according to claim 7, wherein the ECU identifies a point at infinity in the image of the entire image pickup range picked up with the first image quality, and changes the position of the partial region based on the identified point at infinity.

9. The image processing apparatus according to claim 8, wherein: the specific place is an intersection; the region of attention is an oncoming traffic lane when the vehicle enters the intersection; and the ECU identifies the point at infinity with respect to the oncoming traffic lane in the image, and changes the position of the partial region based on the identified point at infinity.

10. The image processing apparatus according to claim 7, wherein the ECU acquires angle information indicating at least one of a steering angle and a body rotation angle of the vehicle, and changes the position of the partial region based on the acquired angle information.

11. The image processing apparatus according to claim 10, wherein: the specific place is an intersection; the region of attention is an oncoming traffic lane when the vehicle enters the intersection; and the ECU changes the position of the partial region based on the acquired angle information such that the partial region moves in a direction opposite to a direction in which the vehicle rotates.

12. The image processing apparatus according to claim 7, wherein: the specific place is a vicinity of an ingress or an egress of a sloping road; and the ECU identifies a gradient of the sloping road from map information including gradient information and from position information indicating a current position of the vehicle, and changes the position of the partial region based on the identified gradient.

13. The image processing apparatus according to claim 7, wherein the in-vehicle camera includes the ECU.

* * * * *